US012326685B2

(12) United States Patent
Shibukawa et al.

(10) Patent No.: US 12,326,685 B2
(45) Date of Patent: Jun. 10, 2025

(54) IMAGE FORMING APPARATUS

(71) Applicant: CANON KABUSHIKI KAISHA, Tokyo (JP)

(72) Inventors: Kenta Shibukawa, Shizuoka (JP); Go Shindo, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 18/495,877

(22) Filed: Oct. 27, 2023

(65) Prior Publication Data

US 2024/0142908 A1 May 2, 2024

(30) Foreign Application Priority Data

Oct. 31, 2022 (JP) ................................ 2022-174193

(51) Int. Cl.
*G03G 15/00* (2006.01)
*G03G 15/08* (2006.01)
*G03G 21/00* (2006.01)

(52) U.S. Cl.
CPC ..... *G03G 21/0011* (2013.01); *G03G 15/0877* (2013.01); *G03G 21/0088* (2013.01); *G03G 2215/00679* (2013.01); *G03G 2215/00729* (2013.01); *G03G 2215/025* (2013.01)

(58) Field of Classification Search
CPC ............ G03G 15/0877; G03G 21/011; G03G 21/0088; G03G 2215/00679; G03G 2215/00729; G03G 2215/025
See application file for complete search history.

(56) References Cited

U.S. PATENT DOCUMENTS

2010/0081077 A1* 4/2010 Testardi ................ G03G 13/08 430/125.4
2017/0227914 A1* 8/2017 Ueno ................ G03G 21/0011

FOREIGN PATENT DOCUMENTS

JP 2012-208167 A 10/2012
JP 2015-212770 A 11/2015
JP 2018-036428 A 3/2018

* cited by examiner

*Primary Examiner* — Hoang X Ngo
(74) *Attorney, Agent, or Firm* — Venable LLP

(57) ABSTRACT

An image forming apparatus includes an image bearing member, a developing device, a cleaning member, a collecting container having a discharge port for collecting a developer, and a control portion that can execute a supply mode in which a region of the image bearing member that is supplied with the developer from the developing device passes through the contact region with rotation of the image bearing member to allow the cleaning member to supply the developer into the collecting container. The discharge port is provided between a first end portion and a second end portion of the image bearing member in a direction of a rotation axis line of the image bearing member. The control portion performs control such that a portion of the region supplied with the developer in the supply mode overlaps, in the direction of the rotation axis line, a position where the discharge port is provided.

15 Claims, 11 Drawing Sheets

IMAGE FORMING APPARATUS

BACKGROUND OF THE INVENTION

Field of the Invention

The present invention relates to an electrophotographic image forming apparatus.

Description of the Related Art

As a configuration of an electrophotographic image forming apparatus, a configuration in which a cleaning member such as a cleaning blade is brought into contact with a surface of an image bearing member such as a photosensitive drum to scrape off a toner on the image bearing member therefrom has been known conventionally. The waste toner scraped off by the cleaning member from the surface of the image bearing member is conveyed by a conveying member, such as a conveying screw, to a container.

Japanese Patent Application Publication No. 2012-208167 discloses a configuration including a first conveying portion that conveys a waste toner scraped off from a surface of a photosensitive drum in a direction of a rotation axis line of the photosensitive drum and a second conveying portion that conveys the waste toner conveyed from the first conveying portion in a direction crossing the direction of the rotation axis line of the photosensitive drum. In the configuration, the second conveying portion is provided at a position not overlapping the photosensitive drum in the direction of the rotation axis line of the photosensitive drum.

SUMMARY OF THE INVENTION

As a result of diligent study by the present inventors, the second conveying portion that conveys the waste toner is configured to be disposed at a position overlapping each of an image bearing member and a cleaning member in the direction of the rotation axis line, and an improvement has thus been made to the configuration described in Japanese Patent Application Publication No. 2012-208167 by reducing a size of an image forming apparatus.

In the improved configuration described above, a discharge port of the first conveying portion for conveying the waste toner from the first conveying portion to the second conveying portion is provided at a position overlapping the cleaning member in the direction of the rotation axis line of the image bearing member. In such a configuration, the waste toner stagnates in the vicinity of the discharge port of the first conveying portion and, when the waste toner is accumulated, a condition of the cleaning member may be affected thereby to cause faulty cleaning.

It is therefore an object of the present invention to provide an image forming apparatus which efficiently suppresses occurrence of faulty cleaning due to waste toner stagnation.

To attain the object described above, an image forming apparatus of the present invention includes:

a rotatable image bearing member;

a developing device that supplies a developer to a surface of the image bearing member;

a cleaning member that comes into contact with the surface of the image bearing member to form a contact region, the cleaning member removing the developer from the surface in the contact region;

a collecting container that collects the developer removed by the cleaning member, the collecting container having a discharge port for discharging the developer; and a control portion that can execute a supply mode during a non-image-forming period, the supply mode in which a region of the image bearing member that is supplied with the developer from the developing device passes through the contact region with rotation of the image bearing member to allow the cleaning member to supply the developer into the collecting container, wherein the discharge port is provided between a first end portion and a second end portion, which the first end portion is one end portion and the second end portion is another end portion of the image bearing member in a direction of a rotation axis line of the image bearing member, and wherein the control portion performs control such that a portion of the region that is supplied with the developer in the supply mode overlaps, in the direction of the rotation axis line, a position where the discharge port is provided.

Additionally, to attain the object described above, an image forming apparatus of the present invention includes:

a rotatable image bearing member;

a developing device that supplies a developer to a surface of the image bearing member;

a cleaning member that comes into contact with the surface of the image bearing member to form a contact region, the cleaning member removing the developer from the surface in the contact region;

a collecting container that collects the developer removed by the cleaning member, the collecting container having a discharge port for discharging the developer;

a conveying member that conveys, in a direction of a rotation axis line of the image bearing member, the developer removed by the cleaning member into the collecting container; and a control portion that can execute a supply mode during a non-image-forming period, the supply mode in which a region of the image bearing member that is supplied with the developer from the developing device passes through the contact region with rotation of the image bearing member to allow the cleaning member to supply the developer into the collecting container, wherein the discharge port is provided between a first end portion and a second end portion, which the first end portion is one end portion and the second end portion is another end portion of the image bearing member in a direction of a rotation axis line of the image bearing member, and wherein the control portion performs control such that the region supplied with the developer in the supply mode is located, in the direction of the rotation axis line, in a vicinity of and on an upstream side of a position where the discharge port is provided in a direction of a conveyance by the conveying member.

According to the present invention, it is possible to provide an image forming apparatus which efficiently suppresses occurrence of faulty cleaning due to waste toner stagnation.

Further features of the present invention will become apparent from the following description of exemplary embodiments with reference to the attached drawings.

DESCRIPTION OF THE EMBODIMENTS

Figure 1:
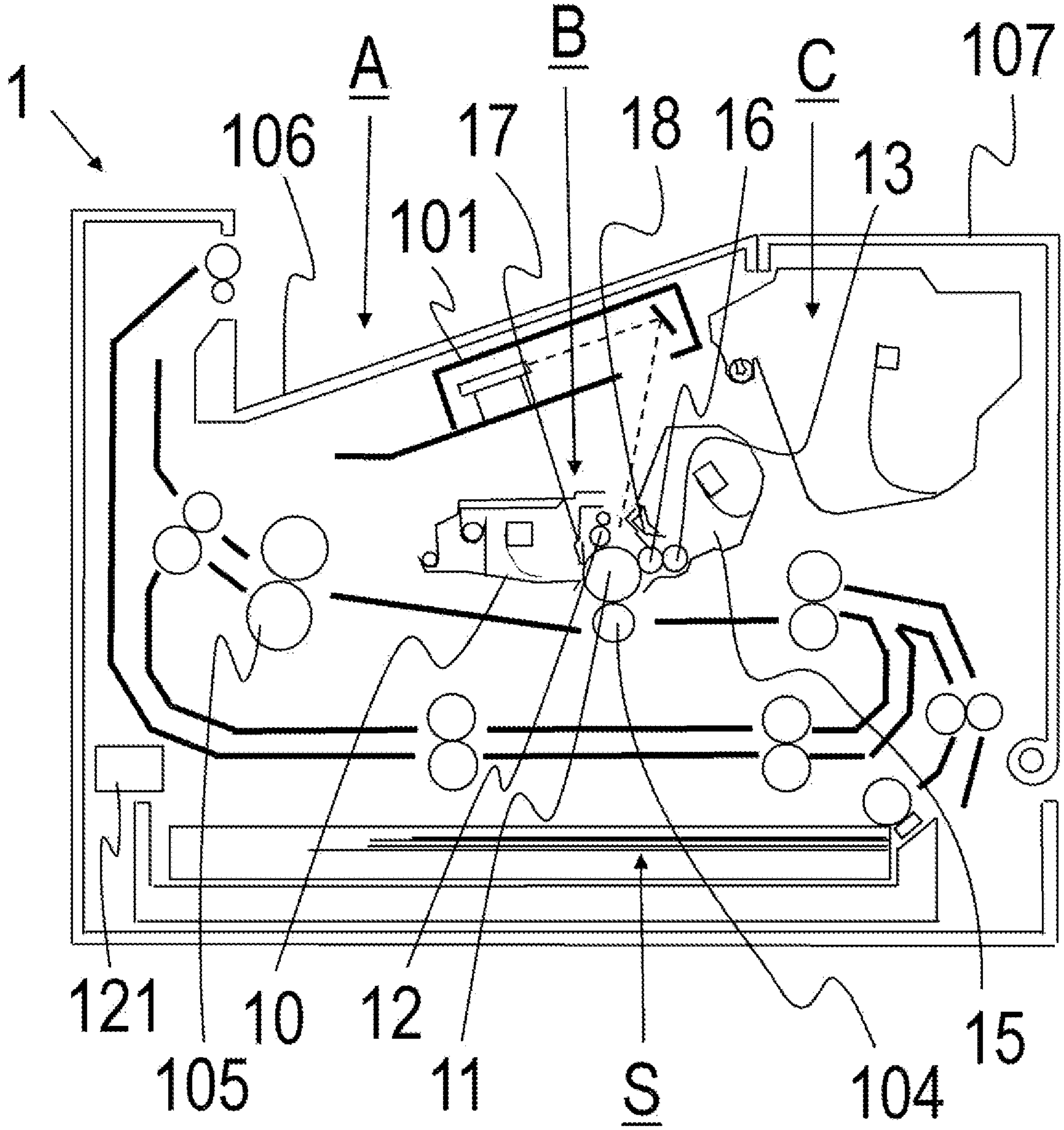
FIG. 1 is a schematic cross-sectional view of an image forming apparatus according to Embodiment 1.

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. A plurality of features are described in each of the following embodiments, but all of these features are not essential for the invention, and these features may be arbitrarily combined. In the accompanying drawings, an identical or similar composing element is denoted with a same reference numeral, and redundant description may be omitted.

In the following description, a cartridge refers to a cartridge which has at least one of a developer, a photosensitive drum, and a process means that acts on the photosensitive drum and is detachable from an image forming apparatus main body (hereinafter referred to as the "apparatus main body"). As a representative example of the cartridge, a process cartridge can be listed. The process cartridge refers to a cartridge including the photosensitive drum and the process means that acts on the photosensitive drum, which is removably attached to the apparatus main body.

Meanwhile, an image forming apparatus forms an image on a recording medium by using an electrophotographic image forming system or the like. Examples of the image forming apparatus using the electrophotographic image forming system include an electrophotographic copier, an electrophotographic printer (such as a LED printer or a laser beam printer), a facsimile apparatus, a word processor, and the like.

Embodiment 1

Schematic Configuration of Laser Printer 1

Figure 2A:
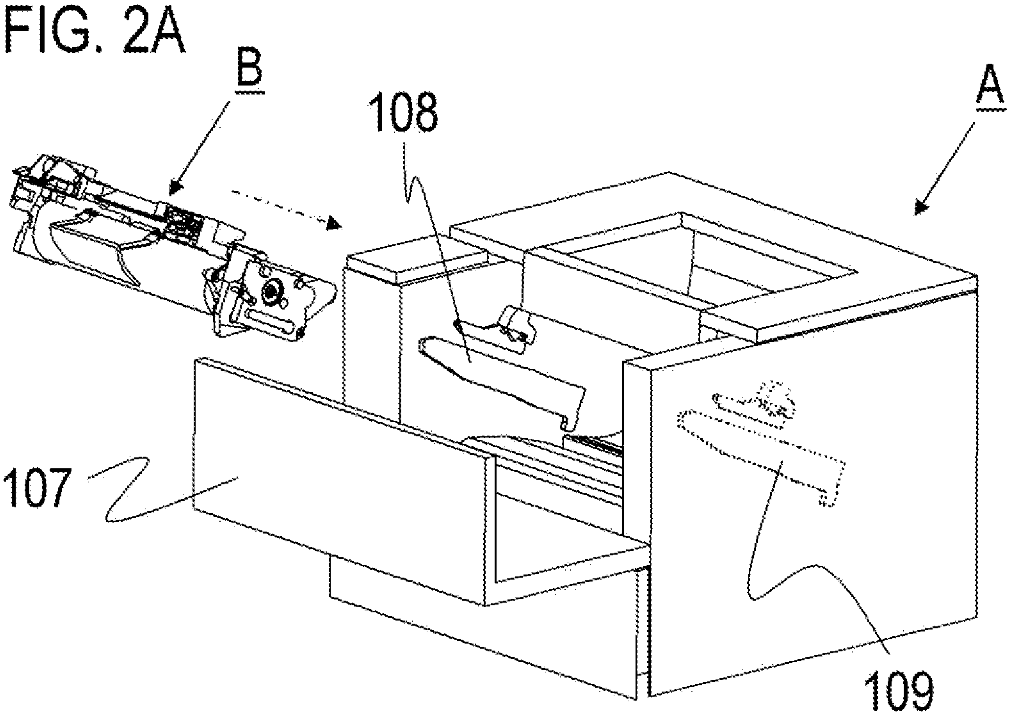
FIGS. 2A and 2B are perspective views of a cartridge and a printer main body each according to Embodiment 1.
Figure 2B:
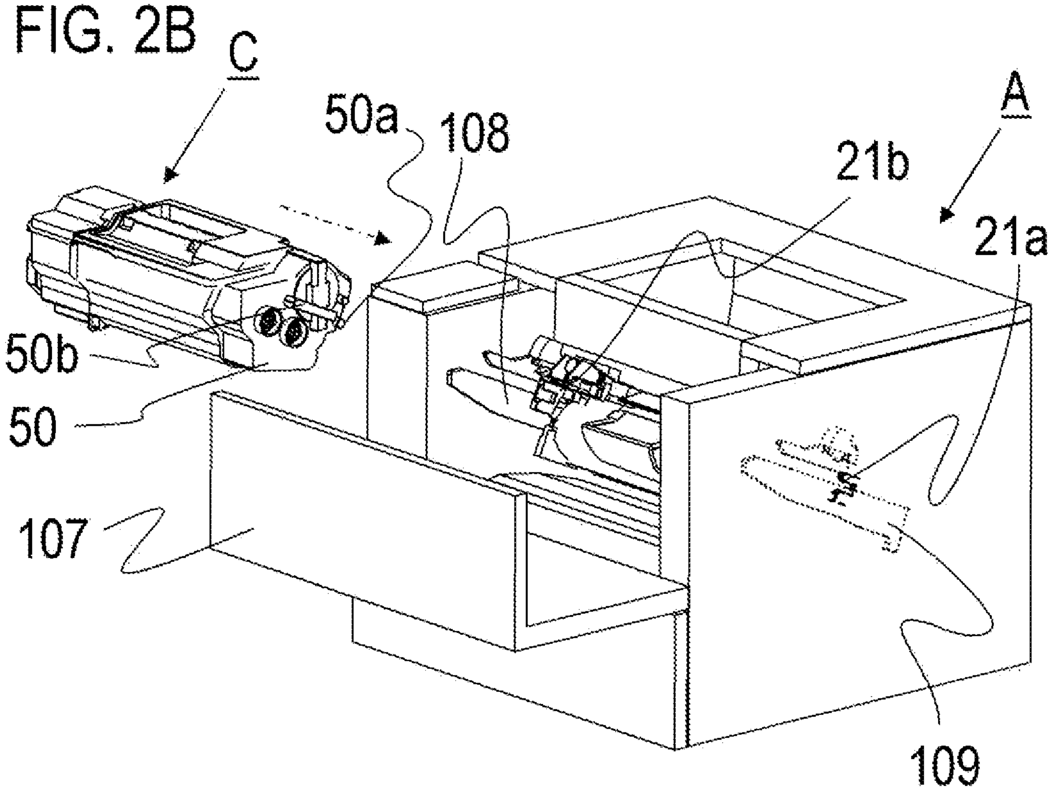

By way of example, a detailed description will be given below of a mode for carrying out the present invention. First, a description will be given of Embodiment 1 in which the present invention is applied to a laser printer 1 as an example of the image forming apparatus. Referring to FIGS. 1, 2A, and 2B, a description will be given of a schematic configuration of the laser printer 1.

FIG. 1 is a schematic cross-sectional view illustrating the schematic configuration of the laser printer 1. As illustrated in FIG. 1, the laser printer 1 includes a printer main body A, a process cartridge B, and a toner cartridge C. Each of the process cartridge B and the toner cartridge C is disposed to be detachable from the printer main body A. Meanwhile, the printer main body A is provided with a transfer roller 104, a fixing portion 105 that fixes an image onto a recording sheet S serving as a recording medium, a receiving tray 106 on which the recording sheet S on which an image forming operation has been completed is stacked, an opening/closing door 107, a laser scanner 101, a control portion 121, and the like.

FIG. 2A is a perspective view illustrating the process cartridge B being attached to the printer main body A. FIG. 2B is a perspective view illustrating the toner cartridge C being attached to the printer main body A. In a state where the opening/closing door 107 of the printer main body A is open, the process cartridge B and the toner cartridge C are detachable from the printer main body A.

The printer main body A is provided with a guide portion 108 and a guide portion 109 which face each other. The process cartridge B is guided by each of the guide portion 108 and the guide portion 109 to be disposed in a facing space between the guide portion 108 and the guide portion 109 and attached to the printer main body A.

A side cover 50 of the toner cartridge C is provided with positioning bosses 50*a* and a guided portion 50*b*. The toner cartridge C is guided by the guided portion 50*b* to the guide portion 108 and the guide portion 109 to be disposed adjacent to the process cartridge B in the facing space between the guide portion 108 and the guide portion 109 and attached to the printer main body A. At this time, the toner cartridge C is positioned by the positioning bosses 50*a* and positioning portions 21*a* and 21*b* with respect to the printer main body A.

Figure 3:
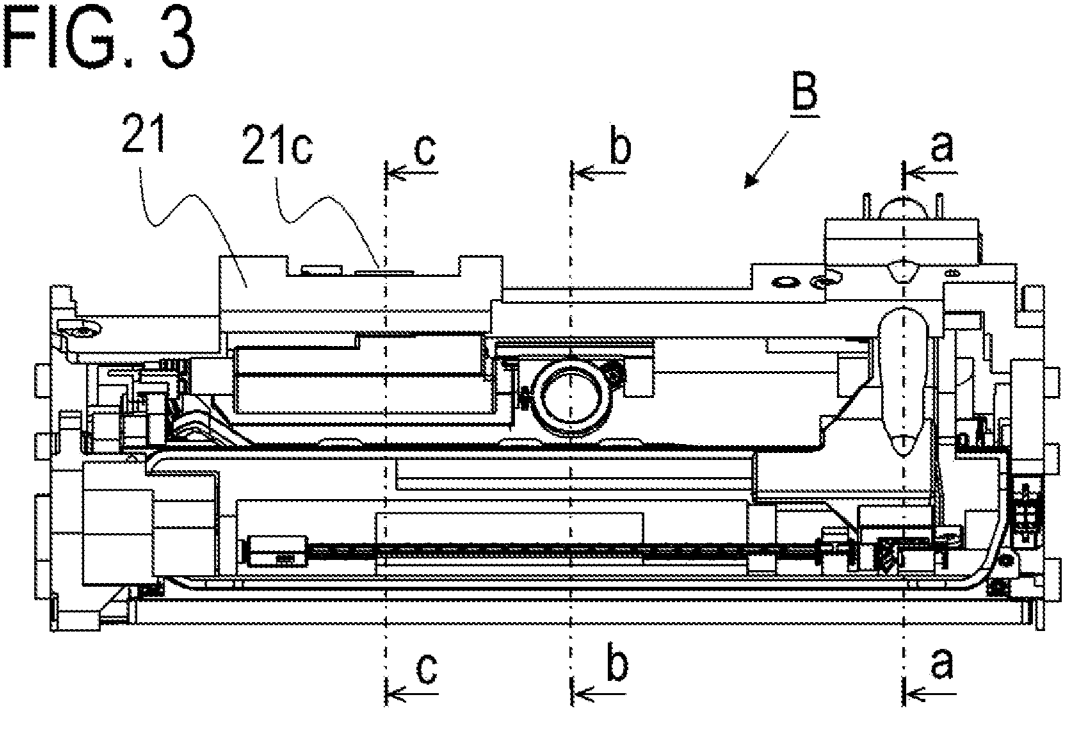
FIG. 3 is a front view of a process cartridge according to Embodiment 1.
Figure 4A:
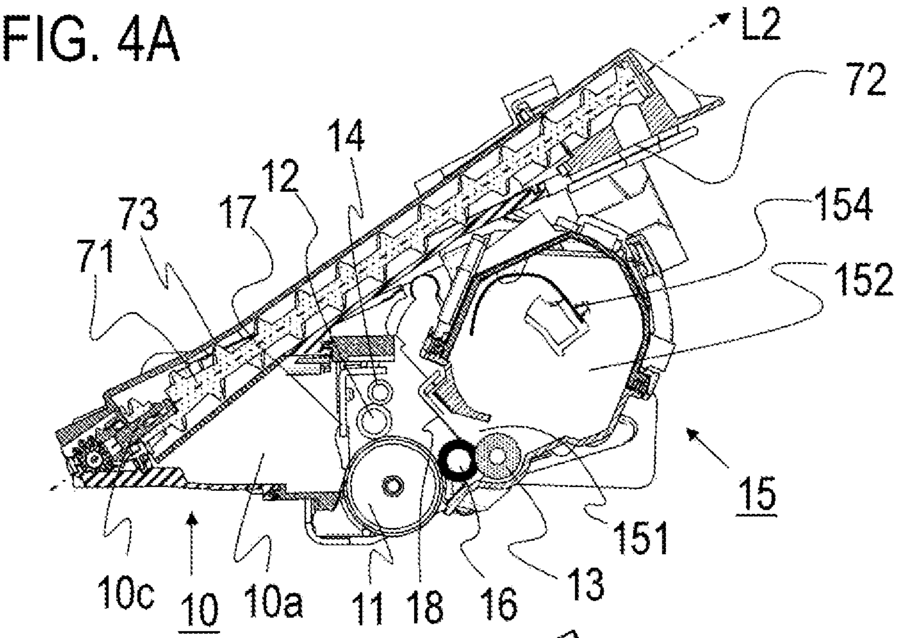
FIGS. 4A to 4C are cross-sectional views of the process cartridge according to Embodiment 1.
Figure 4B:
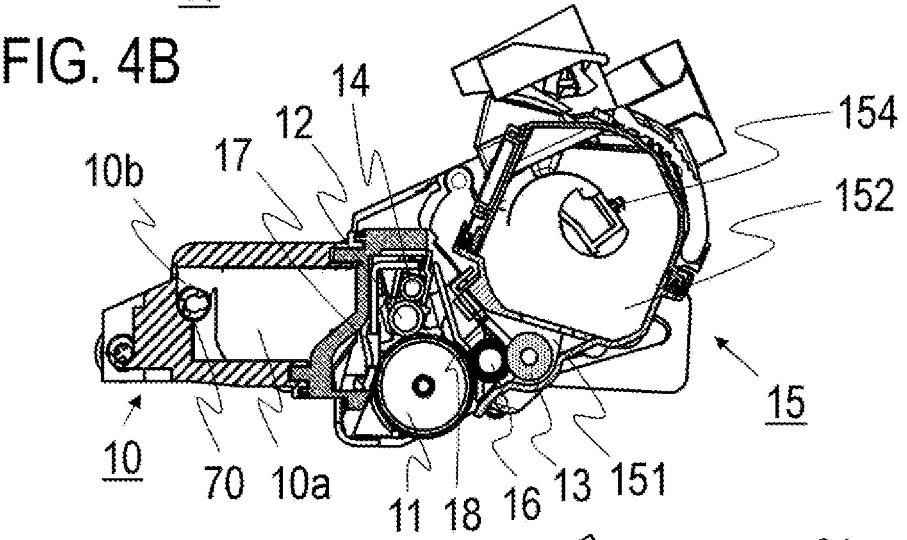
Figure 4C:
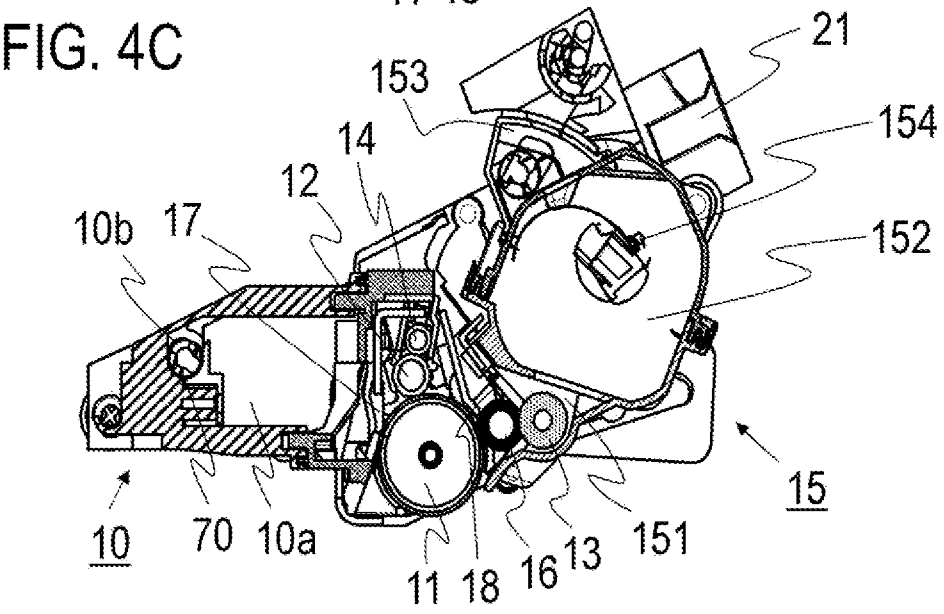

Next, referring to FIG. 3 and FIGS. 4A to 4C, a description will be given of a configuration of the process cartridge B according to the present embodiment. FIG. 3 is a front view of the process cartridge B. FIGS. 4A to 4C are cross-sectional views of the process cartridge B. FIG. 4A illustrates an a-a cross section in FIG. 3, which is a cross section passing through a toner discharge port 10*c*. FIG. 4B illustrates a b-b cross section in FIG. 3, which is a cross section passing through a center portion of the process cartridge B in a longitudinal direction. FIG. 4C illustrates a c-c cross section in FIG. 3, which is a cross section passing through a replenishing port 21*c* in a stay 21.

The process cartridge B includes a cleaning unit 10 including a photosensitive drum 11 serving as an image bearing member and a developing unit 15 including a developing roller 16 serving as a developing means that carries a developer (toner). As described above, these units are integrally detachable as the process cartridge B from the printer main body A.

The cleaning unit 10 includes the rotatable photosensitive drum 11, a cleaning blade 17 serving as a cleaning member for the photosensitive drum 11, a charging roller 12 serving as a charging member, and a charging roller cleaner 14 serving as a cleaning member for the charging roller 12. The cleaning unit 10 also has a waste toner containing portion 10*a*. The waste toner containing portion 10*a* functions as a portion of a collecting container for containing a waste toner scraped off by the cleaning blade 17 from a surface of the photosensitive drum 11. The photosensitive drum 11 and the charging roller 12 are provided to be rotatable around a rotation axis line parallel to the longitudinal direction of the cleaning unit 10. The waste toner containing portion 10*a* is formed longer than at least the cleaning blade 17 in the direction of the rotation axis line of the photosensitive drum 11.

The charging roller 12 is disposed so as to come into contact with an outer peripheral surface of the photosensitive drum 11 and driven to rotate with respect to the photosensitive drum 11. The charging roller 12 charges the photosensitive drum 11 with a voltage applied from the printer main body A.

The cleaning blade 17 is a cleaning member having an elasticity and disposed so as to come into contact with the surface (outer peripheral surface) of the photosensitive drum 11. When the sheet-like recording sheet S serving as the recording medium passes through between the photosensitive drum 11 and the transfer roller 104 during the image forming operation, the toner remains on the surface of the photosensitive drum 11. The cleaning blade 17 has a leading end thereof which comes into contact with the photosensitive drum 11, while being warped, to remove the residual toner from the photosensitive drum 11. By the cleaning blade 17, the residual toner removed from the surface of the photosensitive drum 11 is contained as the waste toner in the waste toner containing portion 10*a*.

The developing unit 15 is a developing device including the developing roller 16 and a developing blade 18. The developing unit 15 includes a developing chamber 151 in which the developing roller 16 is disposed, a developer containing chamber 152 that supplies the toner to the developing chamber 151, and a receiving chamber 153 that receives the toner supplied from the toner cartridge C. The toner contained in the developer containing chamber 152 is fed out to the developing chamber 151 by rotation of a stirring member 154 provided inside the developer containing chamber 152 to be supplied to the developing roller 16 via a supply roller 13.

The developing roller 16 is provided to be rotatable around a rotation axis line in a direction parallel to a rotation axis line 11*a* of the photosensitive drum 11 to supply the toner to a developing zone of the photosensitive drum 11. Then, the developing roller 16 develops, using the toner, an electrostatic latent image formed on the photosensitive drum 11.

The developing blade 18 comes into contact with a surface of the developing roller 16 to regulate an amount of the toner adhering to a peripheral surface of the developing roller 16 and give triboelectric charging charges to the toner.

When the amount of the toner inside the developer containing chamber 152 becomes not more than a given amount, the toner is supplied from the toner cartridge C to the process cartridge B. An amount of the toner remaining inside the developer containing chamber 152 is sensed with a remaining amount sensing means not shown. The supply of the toner from the toner cartridge C to the process cartridge B is performed via the replenishing port 21*c* in the stay 21. Then, the toner supplied to the developing unit 15 is supplied to the developer containing chamber 152 via the receiving chamber 153.

Waste Toner Conveyance Path

Figure 5:
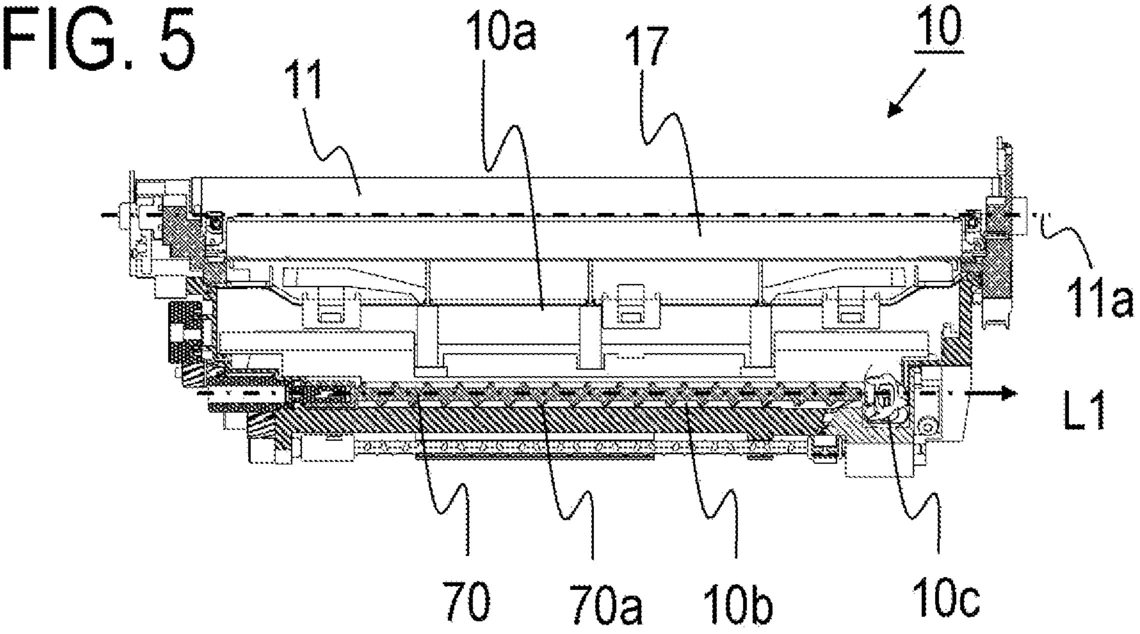
FIG. 5 is a cross-sectional view of a cleaning unit according to Embodiment 1.

Next, referring to FIG. 5, a description will be given of a waste toner conveyance path followed by the waste toner contained in the waste toner containing portion 10*a* until being collected in the toner cartridge C. FIG. 5 is a cross-sectional view obtained by viewing the cleaning unit 10 in a direction perpendicular to the rotation axis line 11*a* of the photosensitive drum 11. The cleaning unit 10 has, in addition to the waste toner containing portion 10*a*, a first waste toner conveyance path 10*b* and the toner discharge port 10*c*. The waste toner containing portion 10*a* and the first waste toner conveyance path 10*b* are included in a collecting container for the waste toner, and the toner discharge port 10*c* functions as a discharge port of the collecting container. The waste toner contained in the waste toner containing portion 10*a* is conveyed by a conveying member to the first waste toner conveyance path 10*b*. Then, the waste toner is conveyed by a first conveying screw 70 provided in the first waste toner conveyance path 10*b* in a conveyance direction L1 parallel to the rotation axis line 11*a* of the photosensitive drum 11.

As illustrated in FIG. 5, the toner discharge port 10*c* is provided in a downstream-side end portion of the first waste toner conveyance path 10*b* in the conveyance direction L1. Then, the toner discharge port 10*c* in the present embodiment is at a position overlapping the cleaning blade 17 in the direction of the rotation axis line 11*a* of the photosensitive drum 11. The waste toner conveyed to the toner discharge port 10*c* is then conveyed to a second waste toner conveyance path 71 through the toner discharge port 10*c*.

Inside the second waste toner conveyance path 71, a second conveying screw 73 is provided to extend from the vicinity of the toner discharge port 10*c* to a waste toner delivery port 72. The waste toner discharged from the toner discharge port 10*c* to the second waste toner conveyance path 71 is conveyed to the toner cartridge C through each of the second waste toner conveyance path 71 and the waste toner delivery port 72 to be collected into the toner cartridge C. In other words, the toner cartridge C contains therein both of the toner to be supplied to the process cartridge B and the waste toner conveyed from the process cartridge B.

Image Forming Operation

Subsequently, referring to FIG. 1, a description will be given of an operation of forming an image on the recording sheet S, which is performed by the laser printer 1. The photosensitive drum 11 driven to rotate by a drive source not shown is uniformly charged to a predetermined potential by the charging roller 12 to which a charging bias is applied. A surface of the photosensitive drum 11 after being charged is subjected to exposure to light by the laser scanner 101, which is based on image information, and charges in an exposed portion are removed to result in formation of an electrostatic latent image. When the toner is supplied from the developing roller 16 to the electrostatic latent image on the photosensitive drum 11, a toner image is visualized.

Meanwhile, in parallel with such an operation of forming a toner image, the recording sheet S is conveyed along a feeding portion. Specifically, a feeding roller rotates to feed the recording sheet S. Then, with the timing of formation of a toner image on the photosensitive drum 11, the recording sheet S is conveyed to between the photosensitive drum 11 and the transfer roller 104. When the recording sheet S passes through between the photosensitive drum 11 and the transfer roller 104, by a transfer bias applied to the transfer roller 104, the toner image is transferred as an unfixed image onto the recording sheet S. Then, the recording sheet S with the toner image transferred thereon is conveyed to the fixing portion 105. The recording sheet S conveyed to the fixing portion 105 is heated and pressurized when passing through the fixing portion 105, and the unfixed image is fixed to the surface of the recording sheet S. The recording sheet S with the image fixed thereon is discharged to the receiving tray 106 and stacked on the receiving tray 106. Note that, in the image forming operation, control of the application of the charging bias and the transfer bias and control of the supply of the recording sheet S is performed by the control portion 121.

Figure 6:
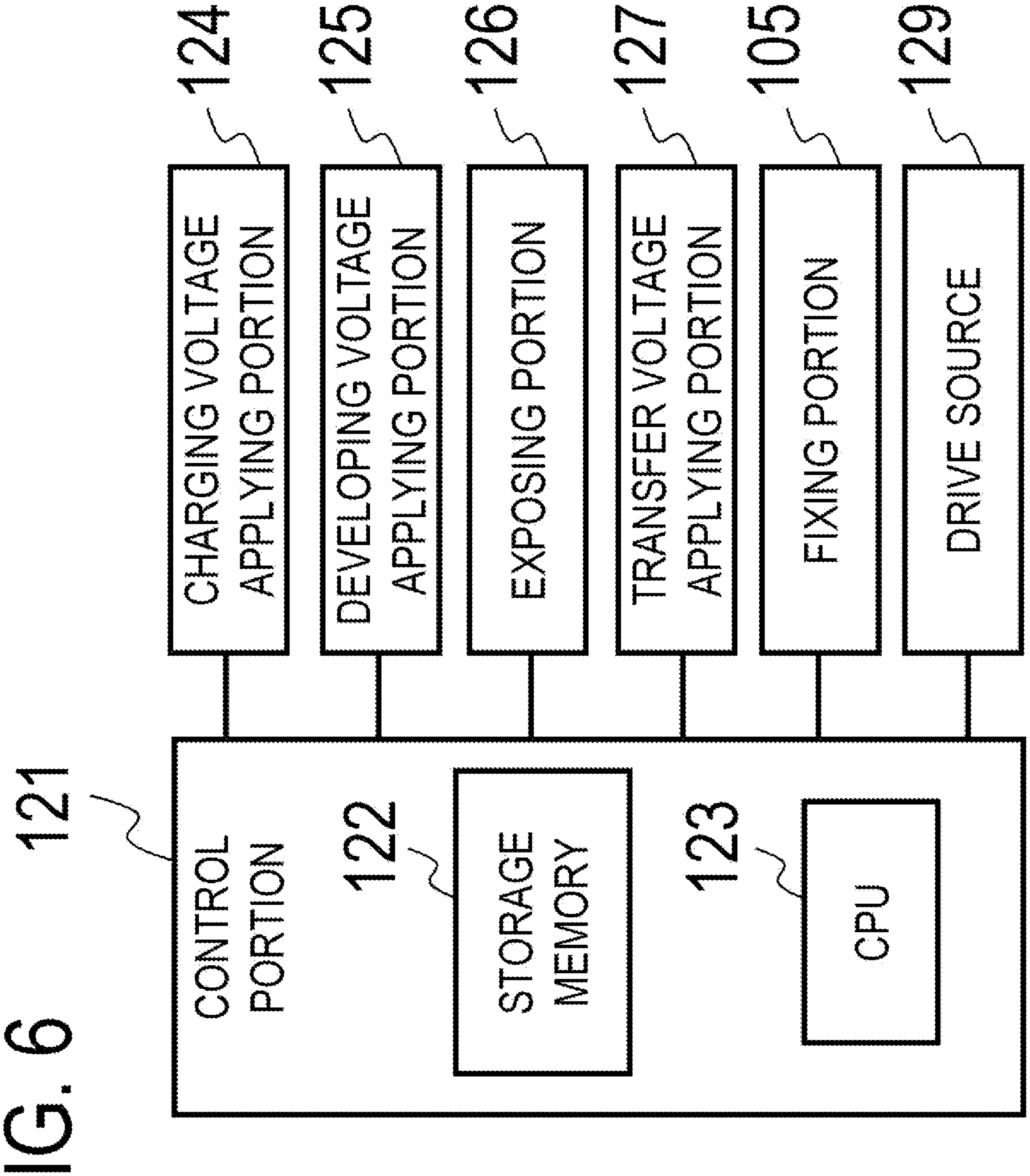
FIG. 6 is a control block diagram of the image forming apparatus according to Embodiment 1.

FIG. 6 is a control block diagram of the laser printer 1. The control portion 121 has a storage memory 122 such as a ROM or a RAM serving as a storing means, a CPU 123 that performs arithmetic processing, and the like. In the storage memory 122, pattern images of toner images for determining a region of the cleaning unit 10 to which the toner is to be supplied from the developing unit 15 and the like are stored in advance.

The control portion 121 controls the following operation of, e.g., a charging voltage applying portion 124, a developing voltage applying portion 125, an exposing portion 126, a transfer voltage applying portion 127, the fixing portion 105, and a drive source 129. In the charging voltage applying portion 124, the application of the charging bias to the charging roller 12 is performed while, in the developing voltage applying portion 125, the application of the developing bias to the developing roller 16 is performed. Meanwhile, in the exposing portion 126, an operation of transmitting a signal for an amount of laser light emitted to irradiate the photosensitive drum 11 to the laser scanner 101 is performed. In the transfer voltage applying portion 127, the application of the transfer bias to the transfer roller 104 is performed. In the fixing portion 105, the recording sheet S is heated by a heat source or the like to allow an image to be fixed onto the recording sheet S. The drive source 129 is, e.g., a motor, and drives the photosensitive drum 11, the developing roller 16, and the like.

Supply Mode

Subsequently, referring to FIGS. 7 and 8, a description will be given of an operation of supplying, during a non-image-forming period, the toner from the developing unit 15 to the cleaning unit 10 in each of supply modes. In the present embodiment, the control portion 121 of the laser printer 1 can execute two different supply modes, which are a first supply mode and a second supply mode. In the storage memory 122 of the control portion 121, a pattern image of a toner image for the first supply mode and a pattern image of a toner image for the second supply mode are stored in advance. By these pattern images, a region of the photosensitive drum 11 to which the toner is to be supplied is determined. Note that the present embodiment is configured to be able to execute the two supply modes, but it may also be possible that three or more pattern images for the supply modes are stored in the storage memory, and the control portion 121 is configured to be able to execute three or more supply modes.

In each of the supply modes, first, to the developing roller 16, the toner is supplied from the developing unit 15. Meanwhile, the photosensitive drum 11 is charged by the charging roller 12 and exposed to light with the laser scanner 101, and consequently an electrostatic latent image corresponding to the pattern image is formed on the surface of the photosensitive drum 11. Then, to the developing roller 16, the developing bias is applied to allow the toner to be supplied from the developing roller 16 to the surface of the photosensitive drum 11 with the electrostatic latent image formed thereon to form a toner image. By changing a width or a shape of the toner image determined by the pattern image, it is possible to appropriately change a range and an amount in which the toner is to be supplied. In the present embodiment, in the first supply mode and the second supply mode, electrostatic latent images having transverse belt shapes having different widths are formed, and toner images having the transverse band shapes are formed.

Then, in the supply mode, the transfer bias is not applied to the transfer roller 104, and the toner on the surface of the photosensitive drum 11 remains as a toner image on the surface without being transferred onto the transfer roller 104. The toner remaining as the toner image on the surface of the photosensitive drum 11 is conveyed by the rotation of the photosensitive drum 11 to a contact region between the photosensitive drum 11 and the cleaning blade 17 to be supplied to a predetermined position. Then, the toner supplied in the supply mode is interposed between the photosensitive drum 11 and the cleaning blade 17 to function as a lubricant or be supplied by the cleaning blade 17 to the waste toner containing portion 10*a*. In other words, the region of the photosensitive drum 11 that is supplied with the toner from the developing unit 15 passes through the contact region between the photosensitive drum 11 and the cleaning blade 17, and consequently the toner is interposed in the contact region or supplied to the waste toner containing portion 10*a*.

Figure 7:
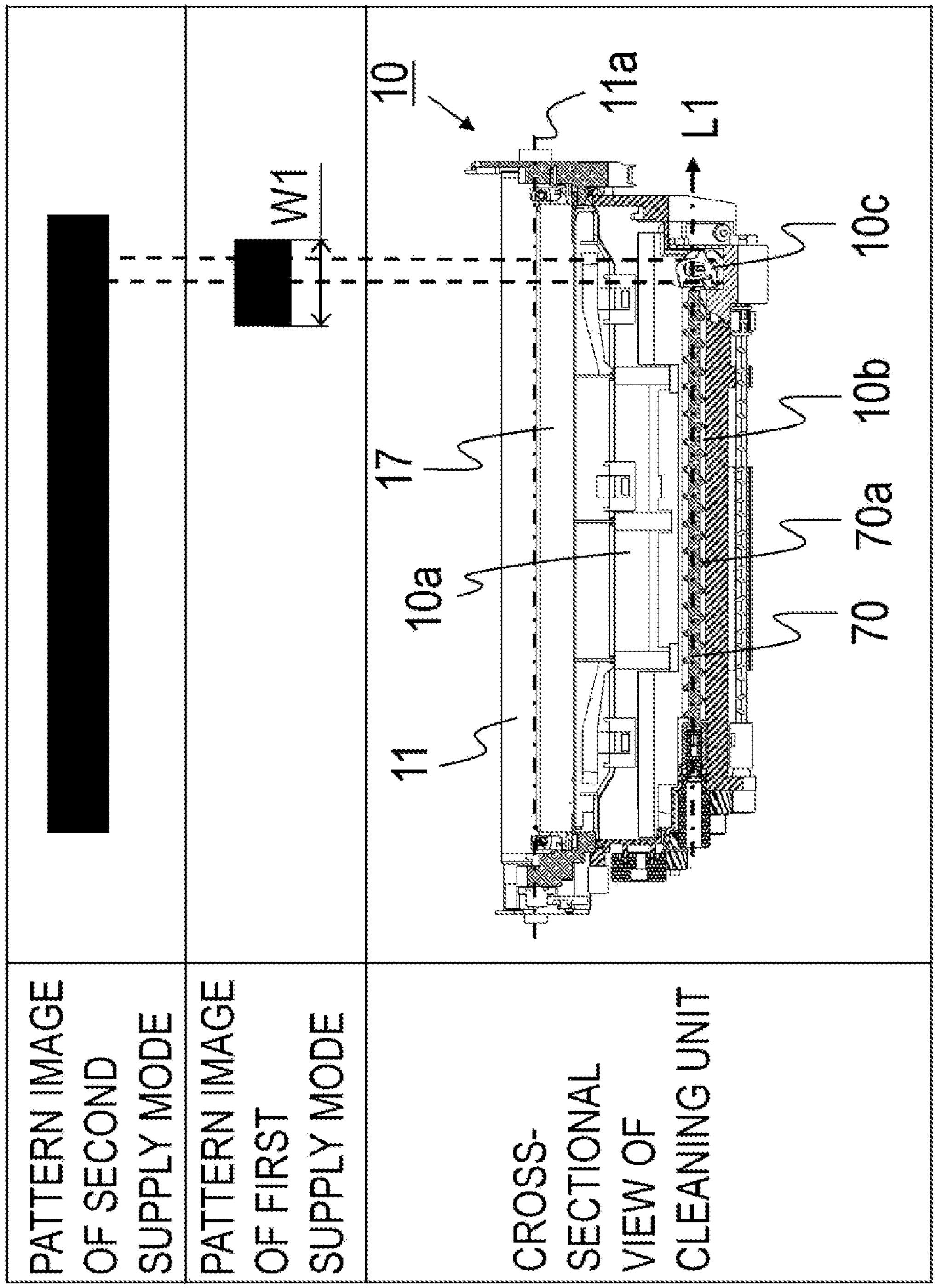
FIG. 7 is a diagram illustrating pattern images of supply modes according to Embodiment 1.
Figure 8:
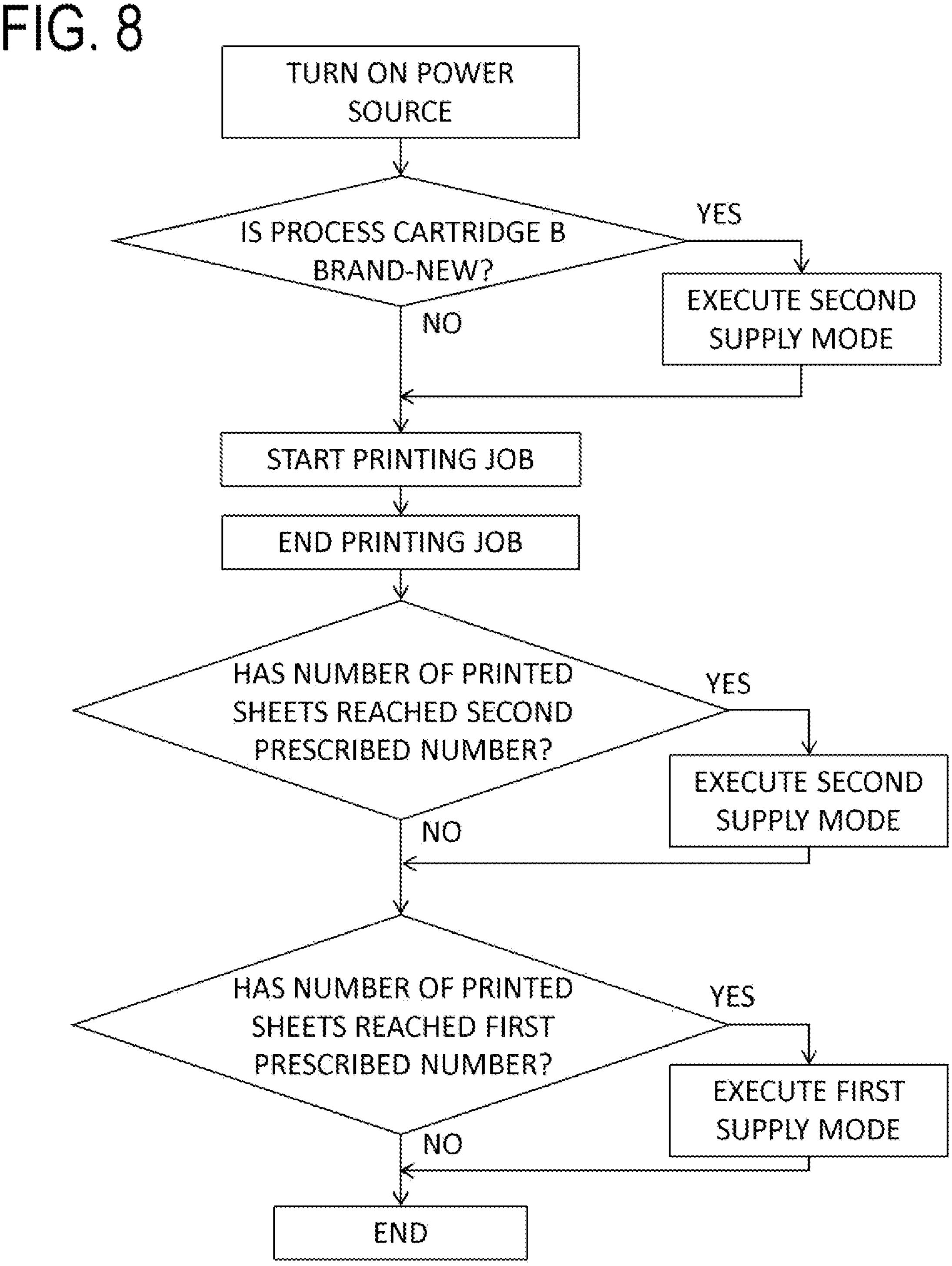
FIG. 8 is a flow chart of the supply mode according to Embodiment 1.

FIG. 7 is a diagram illustrating a positional relationship between each of the pattern images set to the first supply mode and the second supply mode and the cleaning unit 10 in the direction of the rotation axis line 11*a*. In FIG. 7, positions of both ends of the toner discharge port 10*c* in the direction of the rotation axis line 11*a* are indicated by dotted lines. The pattern image of the first supply mode has a transverse band shape covering the toner discharge port 10*c* in the direction of the rotation axis line 11*a* and having a width in a rotation direction of the photosensitive drum 11 which is uniform in the direction of the rotation axis line 11*a*. In other words, the control portion 121 performs control such that a region of the photosensitive drum 11 that is supplied with the toner in the first supply mode overlaps, in the direction of the rotation axis line 11*a*, a position where the toner discharge port 10*c* is provided. The pattern image of the second supply mode has a transverse band shape covering an entire image formable region in the direction of the rotation axis line 11*a* and having a width in the rotation direction of the photosensitive drum 11 which is uniform in the direction of the rotation axis line 11*a*. In other words, the control portion 121 performs control such that the region of the photosensitive drum 11 that is supplied with the toner in the second supply mode overlaps the entire image formable region in the direction of the rotation axis line 11*a*. Briefly, in the first supply mode and the second supply mode, the regions of the surface of the photosensitive drum 11 to which the toner is supplied from the developing roller 16 have the transverse band shapes having different longitudinal widths.

First, a description will be given of the first supply mode in which the toner image overlapping the position where the toner discharge port 10*c* is provided in the direction of the rotation axis line 11*a* is be formed. The first supply mode is a mode in which, to suppress occurrence of stagnation of the waste toner in the vicinity of the toner discharge port 10*c*, the toner is supplied toward the vicinity of the toner discharge port 10*c*. In the present embodiment, a longitudinal width W1 of the pattern image of the first supply mode in the direction of the rotation axis line 11*a* is 3 cm.

The toner that has not been transferred from the photosensitive drum 11 onto the recording sheet S in an image forming process is scraped off by the cleaning blade 17 from the photosensitive drum 11 and collected in the waste toner containing portion 10*a*. Thus, the toner remaining without being transferred from the photosensitive drum 11 to the recording sheet S during image formation is in a state with a flowability lower than that in a state where the toner is supplied from the developing unit 15. Such a toner is conveyed by the first conveying screw 70 to the toner discharge port 10*c* but, when the toner with the low flowability is conveyed in a large amount, the toner may stagnate in the vicinity of the toner discharge port 10*c*. When the toner is not smoothly discharged from the toner discharge port 10*c*, the toner continues to stagnate in the vicinity of the toner discharge port 10*c*. Then, with the image forming operation, an amount of deposition of the stagnant toner increases, and the stagnant toner is gradually accumulated also inside the waste toner containing portion 10*a*. Then, when the stagnant toner continues to increase, the stagnant toner reaches and comes into contact with the cleaning blade 17 to adversely affect a condition of the cleaning blade 17 and cause faulty cleaning.

In the first supply mode, to efficiently suppress occurrence of the faulty cleaning due to a residual toner as described above, the toner is supplied from the developing unit 15 toward the vicinity of the toner discharge port 10*c* where the toner with the low flowability collects. The toner supplied from the developing unit 15 is supplied directly to the waste toner containing portion 10*a* of the cleaning unit 10 without being transferred onto the recording sheet S, and accordingly has a high flowability. Thus, when the toner with the high flowability is supplied to the vicinity of the toner discharge port 10*c* through the waste toner containing portion 10*a* to be mixed with the toner stagnating in the vicinity of the toner discharge port 10*c*, the flowability of the toner in the vicinity of the toner discharge port 10*c* improves. By the first supply mode, the flowability of the toner is improved to improve the stagnation of the waste toner, and the waste toner is likely to be discharged from the toner discharge port 10*c* of the cleaning unit 10.

Next, a description will be given of details of the second supply mode in which the toner image overlapping the entire image formable region is to be formed in the direction of the rotation axis line 11*a*. The second supply mode is a mode in which, at a beginning period of cartridge use or when the number of printed sheets exceeds a prescribed number, the toner is supplied as the lubricant to between the cleaning blade 17 and the photosensitive drum 11. The toner interposed as the lubricant between the cleaning blade 17 and the photosensitive drum 11 reduces a frictional force between the cleaning blade 17 and the photosensitive drum 11 and inhibits the cleaning blade 17 from curling. In addition, a toner layer formed between the cleaning blade 17 and the photosensitive drum 11 allows an effect of improving a cleaning ability to be obtained.

The effects of reducing the frictional force between the cleaning blade 17 and the photosensitive drum 11 and improving the cleaning ability are preferably uniformly obtained in the entire region in the direction of the rotation axis line 11*a*. Therefore, in the second supply mode, the pattern image having the transverse band shape overlapping the entire image formable region in the direction of the rotation axis line 11*a* is set. In other words, in the second supply mode, of the photosensitive drum 11 to which the charging bias has been applied, the entire image formable region in the direction of the rotation axis line 11*a* is exposed to light, and an electrostatic latent image is formed on the surface. With such a configuration, the toner is supplied to the entire region of the cleaning blade 17 in the longitudinal direction, and an effect of inhibiting the cleaning blade 17 from curling and the effect of improving the cleaning ability can be obtained throughout the longitudinal direction.

The pattern image for the first supply mode is set to overlap the toner discharge port 10*c*, not to overlap the entire image formable region in the direction of the rotation axis line 11*a*, and is located offset to one end side in the direction of the rotation axis line 11*a*. In other words, in the first supply mode, of the photosensitive drum 11 to which the charging bias has been applied, a region on one end side in the direction of the rotation axis line 11*a* is exposed to light, and an electrostatic latent image is formed on the surface thereof. The formation of such an electrostatic latent image allows the toner to be concentratively supplied to a portion where the toner with the low flowability collects. Consequently, compared to a configuration in which the toner is supplied to the vicinity of the toner discharge port 10*c* in the pattern image for the second supply mode, the toner stagnation can efficiently be suppressed with a smaller amount of the toner. In other words, an amount of the toner to be supplied to suppress occurrence of the faulty cleaning can be minimized, which leads to a reduction in running cost of the laser printer 1.

Next, referring to FIG. 8, a description will be given of a flow chart in each of the supply modes. FIG. 8 is a flow chart in each of the supply modes according to the present embodiment. In the present embodiment, at the start of use of the brand-new process cartridge B or every time the prescribed number of sheets are printed, the control portion 121 executes the supply mode. The prescribed number of the sheets for executing each of the supply modes is stored in advance in the memory of the control portion 121 and, when the number of the printed sheets reaches the prescribed number, the control portion 121 executes the toner supply mode.

First, when the power source of the laser printer 1 is turned ON, the control portion 121 determines whether or not the process cartridge B attached to the printer main body A is brand-new. When the process cartridge B is brand-new, the toner is supplied as the lubricant to between the cleaning blade 17 and the photosensitive drum 11, and consequently the second supply mode is executed. Then, a printing job is started in a state where the toner is interposed between the cleaning blade 17 and the photosensitive drum 11.

Meanwhile, when the process cartridge B is not brand-new, the printing job is started without execution of the second supply mode. Then, when the printing job is ended, a determination is made about whether or not the number of the printed sheets has reached the prescribed number as a result of the printing job. In the present embodiment, a first prescribed number of sheets for the first supply mode and a second prescribed number of sheets for the second supply mode are distinguished from each other. Also, in the present embodiment, the number of the printed sheets is set to be reset to zero every time the process cartridge B is replaced, but a method of counting the number of the printed sheets is not limited thereto, and another setting method may also be used.

When the number of the printed sheets has reached the second prescribed number set for the second supply mode, after the end of the printing job, the second supply mode is executed. Meanwhile, when the number of the printed sheets has not reached the second prescribed number, the second supply mode is not executed. Then, when the number of the printed sheets has reached the first prescribed number set for the first supply mode, after the end of the printing job, the first supply mode is executed. Meanwhile, when the number of the printed sheets has not reached the first prescribed number, the first supply mode is not executed. Thus, after the end of each printing job, it is determined whether or not the number of the printed sheets has reached the prescribed number, and the supply mode is appropriately executed.

Each of the first prescribed number and the second prescribed number may also include a plurality of values, instead of a single value. For example, when the first supply mode is set so as to be executed once for every 250 printed sheets, the second prescribed number includes values such as 250, 500, and 750, and is represented as 250×Natural Number.

Evaluation Test

Next, a description will be given of an evaluation test performed to confirm an effect of suppressing occurrence of the faulty cleaning which is achieved with the configuration in Embodiment 1. In the evaluation test, as described above, the same test was performed to give an evaluation not only in Embodiment 1 in which the first supply mode was executed for each prescribed number, but also in Comparative Example 1 in which the first supply mode was not executed at all. Comparative Example 1 was configured similarly to Embodiment 1 except that the first supply mode was not executed.

In the evaluation test, uniform images with a 20% print percentage were continued to be printed, and it was checked whether or not the faulty cleaning occurred. Note that, in Embodiment 1, the first supply mode was set to be performed once for every 250 printed sheets. Respective test results of the evaluation test in Embodiment 1 and Comparative Example 1 are shown in Table 1. In Table 1, a case where the faulty cleaning did not occur is indicated as "OK" as acceptable, while a case where the faulty cleaning occurred is indicated as "NG" as unacceptable.

TABLE 1

| | Number of printed sheets | | | | | |
|---|---|---|---|---|---|---|
| | 0 sheet | 2,000 sheets | 4,000 sheets | 6,000 sheets | 8,000 sheets | 10,000 sheets |
| Embodiment 1 (With first supply mode) | OK | OK | OK | OK | OK | OK |
| Comparative Example 1 (Without first supply mode) | OK | OK | OK | OK | NG | NG |

In Comparative Example 1 in which the first supply mode was not executed, at the time when 8,000 sheets were printed, the faulty cleaning occurred. When the cleaning unit 10 in which the faulty cleaning occurred was checked, it was recognized that, at a position where the faulty cleaning occurred, the toner was clogged up to the contact region between the cleaning blade 17 and the photosensitive drum 11. It can be considered that the waste toner with the low flowability continued to stagnate in the vicinity of the toner discharge port 10*c* without being smoothly discharged from the toner discharge port 10*c*, and consequently the waste toner was accumulated up to the contact region. Thus, in Comparative Example 1 in which the first supply mode was not executed, the waste toner came into contact with the cleaning blade 17 to cause the faulty cleaning.

Meanwhile, in Embodiment 1 in which the first supply mode was executed, even at the time when 10,000 sheets were printed, occurrence of the faulty cleaning was not observed. In addition, when the cleaning unit 10 was checked after the number of the printed sheets exceeded 10,000, it could be recognized that the toner was not clogged up to the vicinity of the cleaning blade 17, and the waste toner could stably be discharged from the toner discharge port 10*c*.

Thus, according to Embodiment 1 in which the first supply mode is executed, it is possible to inhibit the toner from stagnating inside the cleaning unit 10 and suppress occurrence of the faulty cleaning. Additionally, compared to a configuration in which only the second supply mode can be executed, according to Embodiment 1, occurrence of the faulty cleaning can efficiently be suppressed with a smaller amount of the toner. Furthermore, since the control portion 121 can selectively execute the first supply mode and the second supply mode, it is possible to perform each of inhibition of the stagnation of the waste toner and improvement of the cleaning ability with appropriate timing and with an appropriate amount of the toner.

Note that, in the configuration of the present embodiment, the pattern image in each of the supply modes has the transverse band shape, but the pattern image is not limited to such a configuration in applying the present invention. For example, the width of the pattern image in the rotation direction need not necessarily be set uniform in the direction of the rotation axis line, and may also be varied in the direction of the rotation axis line. In other words, the pattern image is not limited to a rectangular shape, and may also have another shape such as a trapezoid. The present invention is not only applicable to a configuration in which the toner discharge port 10*c* is located offset to one end side in the direction of the rotation axis line 11*a*, but also applicable to any configuration as long as the toner discharge port 10*c* is provided between a first end portion and a second end portion, which the first end portion is one end portion and the second end portion is another end portion of the photosensitive drum 11 in the direction of the rotation axis line 11*a*. In Embodiment 1, the toner discharge port 10*c* is located on the first end portion side of the image bearing member in the direction of the rotation axis line.

Also, in the present embodiment, in the first supply mode, the toner image overlapping the entire toner discharge port 10*c* in the direction of the rotation axis line 11*a* is formed, but a configuration in which the toner image overlapping a portion of the toner discharge port 10*c* is formed also exerts the effect described above. Even a configuration in which the toner image not overlapping the toner discharge port 10*c* in the direction of the rotation axis line 11*a* is formed achieves the effect described above as long as the toner image is formed in the vicinity of the toner discharge port 10*c* on an upstream side in the conveyance direction L1 of the first conveying screw 70 in the configuration. This is because, in these configurations also, the toner with the high flowability is supplied to the toner discharge port 10*c* to inhibit the waste toner from stagnating. However, the conveyance of the toner to the first conveying screw 70 may deteriorate the flowability of the toner before the toner is conveyed to the toner discharge port 10*c*. Therefore, to desirably obtain an effect of inhibiting waste toner stagnation, the toner image is preferably formed within a range of about 2 cm from an end portion of the toner discharge port 10*c* on the upstream side in the conveyance direction, which corresponds to the vicinity of the toner discharge port 10*c*. Moreover, to desirably obtain the effect of inhibiting waste toner stagnation, it is desirable that, in the direction of the rotation axis line 11*a*, at least a portion of the toner image overlaps the toner discharge port 10*c*.

Embodiment 2

Next, referring to FIG. 9, a description will be given of Embodiment 2 according to the present invention. Embodiment 2 is different from Embodiment 1 in that a frequency of execution of the first supply mode is changed according to an amount of use of the process cartridge B. In the following description, a description of the same components as those of Embodiment 1 is omitted by assigning the same reference signs, and a description will be given mainly of characteristic portions of Embodiment 2.

Figure 9:
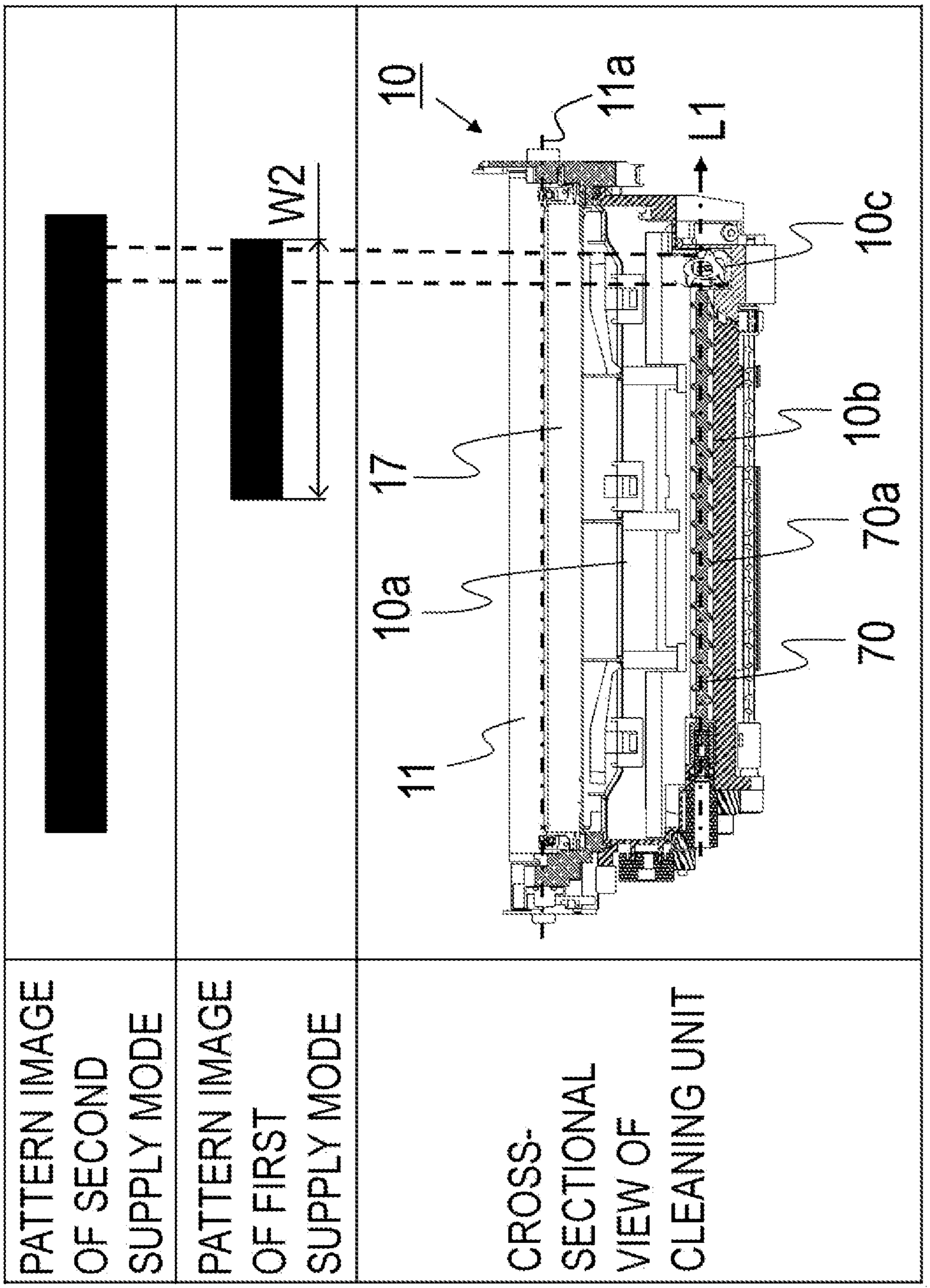
FIG. 9 is a diagram illustrating pattern images of supply modes according to Embodiment 2.

FIG. 9 is a diagram illustrating a positional relationship between each of pattern images set to a first supply mode and a second supply mode according to Embodiment 2 and the cleaning unit 10 in the direction of the rotation axis line 11*a*. In FIG. 9, positions of both ends of the toner discharge port 10*c* in the direction of the rotation axis line 11*a* are indicated by dotted lines. The pattern image of the first supply mode has a transverse band shape covering the toner discharge port 10*c* in the direction of the rotation axis line 11*a* and having a width in the rotation direction of the photosensitive drum 11 which is uniform in the direction of the rotation axis line 11*a*. In other words, the control portion 121 performs control such that the region of the photosensitive drum 11 that is supplied with the toner in the first supply mode overlaps a position where the toner discharge port 10*c* is provided in the direction of the rotation axis line 11*a*. A longitudinal width W2 of the pattern image of the first supply mode in Embodiment 2 in the direction of the rotation axis line 11*a* is 10 cm. The longitudinal width of the pattern image in the first supply mode according to Embodiment 2 is set longer than that in Embodiment 1. Such a configuration is effective when a range in which a flowability of a stagnant toner is increased is to be set wider in the direction of the rotation axis line 11*a*.

In Embodiment 2, the frequency of execution of the first supply mode, i.e., the number of executions for each predetermined number of printed sheets is changed according to a cartridge use rate. The cartridge use rate is a value linked to an amount of the remaining toner, an amount of rotation (running distance) of the developing roller 16, or the like, which is a value correlated to the amount of use of the process cartridge B. When the process cartridge B is in a brand-new state, the cartridge use rate is 0% while, when the process cartridge B has come to the end of the life thereof, the cartridge use rate is 100%. Table 2 shows the cartridge use rates and the numbers of times the first supply mode is executed for every 1,000 printed sheets.

TABLE 2

| Cartridge use rate | 0%~60% | 60%~90% | 90%~100% |
|---|---|---|---|
| Number of executions of first supply mode for every 1,000 printed sheets | 1 | 2 | 4 |

As shown in Table 2, in Embodiment 2, with an increase of the cartridge use rate, the control portion 121 increases the number of executions of the first supply mode for every 1,000 printed sheets and increases the frequency of execution of the first supply mode. While the cartridge use rate is 0% or more and less than 60%, the number of executions of the first supply mode for every 1,000 printed sheets is 1, and the first supply mode is executed once for every 1,000 printed sheets. While the cartridge use rate is 60% or more and less than 90%, the number of executions of the first supply mode for every 1,000 printed sheets is 2, and the first supply mode is executed once for every 500 printed sheets. While the cartridge use rate is at least 90% and not more than 100%, the number of executions of the first supply mode for every 1,000 printed sheets is 4, and the first supply mode is executed once for every 250 printed sheets.

At a beginning period of use of the process cartridge B, the flowability of the toner is relatively high, and consequently the toner is unlikely to stagnate inside the cleaning unit 10. Meanwhile, at an ending period of use of the process cartridge B, the toner degrades and has a lower flowability, and consequently the toner is more likely to stagnate than at the beginning period of use of the process cartridge B. Therefore, when the cartridge use rate is low, the frequency of execution of the first supply mode is set low while, when the cartridge use rate is high, the frequency of execution of the first supply mode is set high and, consequently, the first supply mode is efficiently executed according to the likelihood of stagnation of the toner.

Note that the degradation of the toner is caused by a reduction of an adhesion rate of an external additive adhering to the toner due to rubbing between the developing blade 18 and the developing roller 16 or rubbing of a stirring sheet and by the resulting deterioration of the flowability of the toner. Accordingly, the waste toner collected during image formation has a flowability lower than that of the toner contained inside the developing unit 15. When the process cartridge B is repeatedly used and the toner in the developing unit 15 degrades, the flowability of the waste toner collected during the image formation is much lower than an initial flowability of the waste toner. Consequently, at the ending period of use of the process cartridge B, due to the deterioration of the flowability of the toner resulting from the degradation of the toner, the toner is likely to stagnate inside the cleaning unit 10.

Evaluation Test

Next, a description will be given of an evaluation test performed to confirm the effect of suppressing occurrence of the faulty cleaning, which is achieved with the configuration of Embodiment 2. Details of the evaluation test are the same as details of the evaluation test performed in Embodiment 1. Test results of the evaluation test in Embodiment 2 and Embodiment 1 are shown in Table 3. In Table 3, a case where the faulty cleaning did not occur is indicated as "OK" as acceptable, while a case where the faulty cleaning occurred is indicated as "NG" as unacceptable. The process cartridge B used in the evaluation test has specifications such that the cartridge B comes to the end of the life thereof when 10,000 sheets are printed and the cartridge use rate becomes 100%.

TABLE 3

| | | Number of printed sheets | | | | | |
|---|---|---|---|---|---|---|---|
| | | 0 sheet | 2,000 sheets | 4,000 sheets | 6,000 sheets | 8,000 sheets | 10,000 sheets |
| | Cartridge use rate | 0% | 20% | 40% | 60% | 80% | 100% |
| Embodiment 2 | Faulty cleaning | OK | OK | OK | OK | OK | OK |
| | Number of executions of first supply mode for every 1,000 printed sheets | 1 | 1 | 1 | 2 | 2 | 4 |

TABLE 3-continued

| | | Number of printed sheets | | | | | |
|---|---|---|---|---|---|---|---|
| | | 0 sheet | 2,000 sheets | 4,000 sheets | 6,000 sheets | 8,000 sheets | 10,000 sheets |
| Embodiment 1 | Faulty cleaning | OK | OK | OK | OK | OK | OK |
| | Number of executions of first supply mode for every 1,000 printed sheets | 4 | 4 | 4 | 4 | 4 | 4 |

In Embodiment 1, as described above, the first supply mode is executed once for every 250 printed sheets. In other words, in Embodiment 1, while the cartridge use rate is 0% to 100%, the number of executions of the first supply mode for every 1,000 printed sheets is 4. In Embodiment 1, even when the number of printed sheets reached 10,000, the faulty cleaning did not occur.

In Embodiment 2, as shown in Table 2, the number executions of the first supply mode for every 1,000 printed sheets varies according to the number of printed sheets. In Embodiment 2, when the cartridge use rate is less than 90%, the number of executions of the first supply mode for every 1,000 printed sheets is smaller than that in Embodiment 1. However, in Embodiment 2 also, even when the number of printed sheets reached 10,000, the faulty cleaning did not occur.

Thus, according to Embodiment 2, as compared to Embodiment 1, the number of executions of the first supply mode is reduced, and it is possible to inhibit the toner from stagnating inside the cleaning unit 10 and suppress occurrence of the faulty cleaning. In other words, according to Embodiment 2, it is possible to vary the number of executions of the supply mode according to a use situation of the cartridge and more efficiently suppress occurrence of the faulty cleaning by reducing the number of supplies of the toner.

Note that, in Embodiment 2, the frequency of execution of the supply mode is varied according to the cartridge use rate, but it may also be possible to vary an amount of the toner to be supplied per shot according to, e.g., the cartridge use rate. Even from a configuration in which the amount of the toner to be supplied is small when the cartridge use rate is low and the amount of the toner to be supplied is set large when the cartridge use rate is high, the same function/effect as obtained in Embodiment 2 can be obtained.

Alternatively, it may also be possible to set a plurality of the supply modes with the different pattern images and switch the supply mode to be used according to the cartridge use rate to change a shape of a toner supply region. Even from a configuration in which a toner supply range is set small when the cartridge use rate is low and the toner supply range is set large when the cartridge use rate is high, the same work/effect as obtained in Embodiment 2 can be obtained. Furthermore, even from a configuration in which the number of executions of the first supply mode, the amount of the toner to be supplied, and the pattern image are changed in conjunction with, instead of the cartridge use rate, another parameter correlated to the amount of use of the process cartridge B, the same function/effect as obtained in Embodiment 2 can be obtained. Also, in the present embodiment, the amount of use of the cartridge is defined, but it may also be possible to provide a configuration using a parameter which is 100% when the cartridge is brand-new and becomes 0% when a specified number of printed sheets, which is 10,000 in the present embodiment, is reached and the cartridge comes to the end of the life thereof, such as a cartridge usable amount.

Embodiment 3

Next, referring to FIGS. 10 and 11, a description will be given of Embodiment 3 according to the present invention. In Embodiment 3, a portion of the configuration of the cleaning unit 10 and the pattern image of the first supply mode are different from those in Embodiment 1. In the following description, a description of the same components as those of Embodiment 1 is omitted by assigning the same reference signs, and a description will be given mainly of characteristic portions of Embodiment 3.

Figure 10:
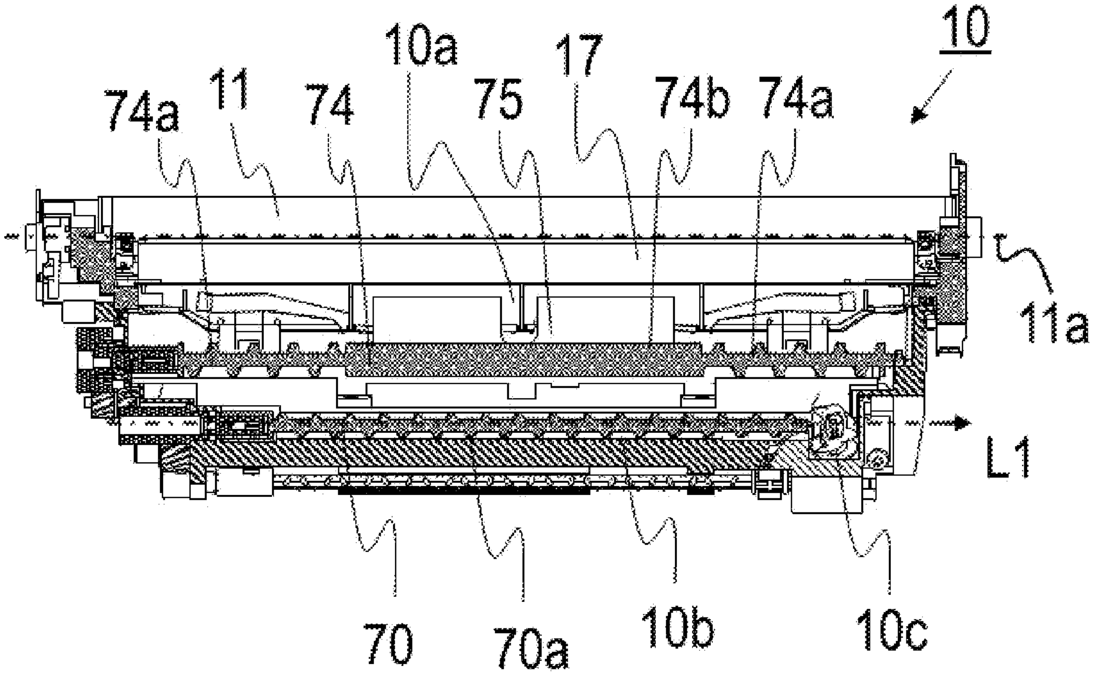
FIG. 10 is a cross-sectional view of a cleaning unit according to Embodiment 3.

FIG. 10 is a cross-sectional view obtained by viewing the cleaning unit 10 according to Embodiment 3 in a direction perpendicular to the rotation axis line 11*a* of the photosensitive drum 11. The waste toner containing portion 10*a* of the cleaning unit 10 according to Embodiment 3 is provided with, each as a toner conveying member, a third conveying screw 74 and a waste toner conveying sheet 75. The third conveying screw 74 has helical portions 74*a* and a sheet fixing portion 74*b* for fixing the waste toner conveying sheet 75. The third conveying screw 74 is provided to be rotatable around a rotation axis line extending in a direction parallel to the rotation axis line 11*a*. The sheet fixing portion 74*b* is located at a middle portion of the third conveying screw 74 in the direction of the rotation axis line thereof, and the helical portions 74*a* extend on both sides of the sheet fixing portion 74*b* toward leading ends thereof. The waste toner conveying sheet 75 is a sheet which extends from the sheet fixing portion 74*b* in a direction perpendicular to the direction of the rotation axis line of the third conveying screw 74 and has a free leading end in the extending direction thereof. The waste toner conveying sheet 75 serving as a sheet portion of the third conveying screw 74 pushes the waste toner toward the first waste toner conveyance path 10*b* with rotation of the third conveying screw 74.

In the configuration of Embodiment 3 also, the waste toner scraped off by the cleaning blade 17 from the surface of the photosensitive drum 11 is collected into the waste toner containing portion 10*a*. Then, the waste toner inside the waste toner containing portion 10*a* is conveyed by the helical portions 74*a* of the third conveying screw 74 in the direction of the rotation axis line 11*a* toward a center portion of the waste toner containing portion 10*a*. Then, the waste toner conveyed to the center portion of the waste toner containing portion 10*a* is conveyed by the waste toner conveying sheet 75 to the first waste toner conveyance path 10*b*.

The waste toner that has reached the first waste toner conveyance path 10*b* is conveyed by the helical portions 70*a* provided in the first conveying screw 70 in the conveyance direction L1 parallel to the rotation axis line 11*a* of the photosensitive drum 11 to reach the toner discharge port 10*c*. Then, the waste toner is discharged from the toner discharge port 10*c* to the second waste toner conveyance path 71. Meanwhile, when there is the waste toner that could not be discharged, the waste toner moves toward the third conveying screw 74 to be conveyed again by the third conveying screw 74 to a middle portion in the direction of the rotation axis line 11*a* and conveyed to the first waste toner conveyance path 10*b*.

Figure 11:
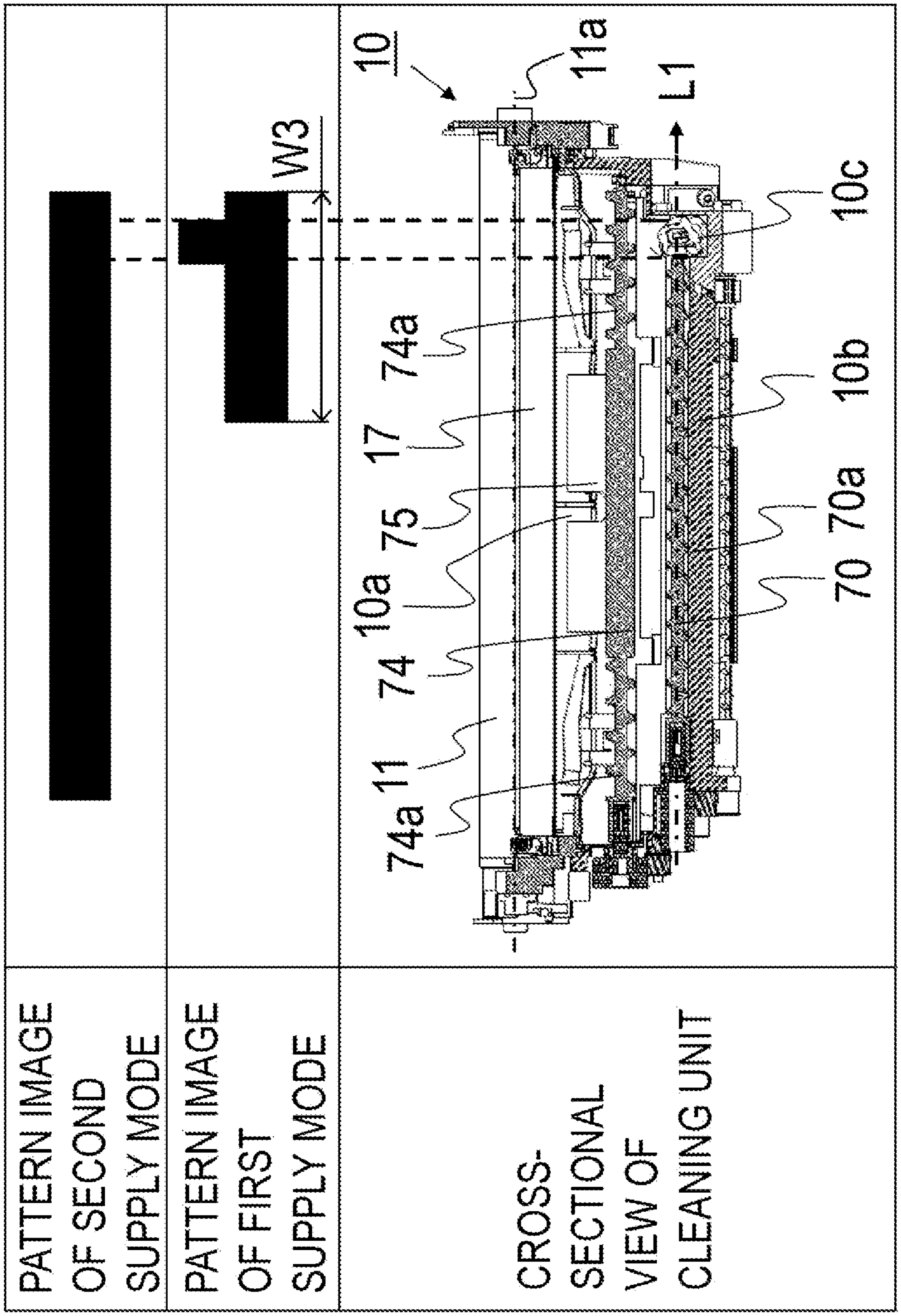
FIG. 11 is a diagram illustrating pattern images of supply modes according to Embodiment 3.

FIG. 11 is a diagram illustrating a positional relationship between each of pattern images set to the first supply mode and the second supply mode according to Embodiment 3 and the cleaning unit 10 in the direction of the rotation axis line 11*a*. In FIG. 11, the positions of the both ends of the toner discharge port 10*c* in the direction of the rotation axis line 11*a* are indicated by dotted lines. For the sake of convenience, a description of the pattern image of the first supply mode will be given separately of a transverse band portion thereof and a projecting portion thereof projecting from the transverse band portion. In the direction of the rotation axis line 11*a*, the transverse band portion covers the toner discharge port 10*c* and extends to a position overlapping the waste toner conveying sheet 75. Meanwhile, the projecting portion projects from the transverse band portion in the rotation direction at a position overlapping a position where the toner discharge port 10*c* is provided in the direction of the rotation axis line 11*a*. In other words, the pattern image of the first supply mode is formed to have a width in the rotation direction of the photosensitive drum 11 which is accordingly larger by a portion thereof overlapping the position where the toner discharge port 10*c* is provided in the direction of the rotation axis line 11*a*. In other words, a portion of the pattern image overlapping the position where the toner discharge port 10*c* is provided is larger in width in the rotation direction of the photosensitive drum 11 than a portion of the pattern image not overlapping the position where the toner discharge port 10*c* is provided. A longitudinal width W3 of the transverse band portion of the pattern image of the first supply mode in Embodiment 3 in the direction of the rotation axis line of the photosensitive drum 11 is 10 cm. By providing such a configuration, it is possible to concentratively supply the toner to a portion where the waste toner is particularly likely to stagnate and more effectively inhibit waste toner stagnation.

Evaluation Test

Next, a description will be given of an evaluation test performed to confirm the effect of suppressing occurrence of faulty cleaning, which is achieved with the configuration of Embodiment 3. Details of the evaluation test are the same as details of the evaluation test performed in Embodiment 1. In the evaluation test, the same test was performed to give an evaluation not only in Embodiment 3 in which the first supply mode was executed for each predetermined number of printed sheets, but also in Comparative Example 2 in which the first supply mode was not executed at all. Comparative Example 2 was configured similarly to Embodiment 3 except that the first supply mode was not executed.

In the evaluation test, uniform images with a 20% print percentage were continued to be printed, and it was checked whether or not the faulty cleaning occurred. Note that, in Embodiment 3, the first supply mode was set to be performed once for every 500 printed sheets. Respective test results of the evaluation test in Embodiment 3 and Comparative Example 2 are shown in Table 4. In Table 4, a case where the faulty cleaning did not occur is indicated as “OK” as acceptable, while a case where the faulty cleaning occurred is indicated as “NG” as unacceptable.

TABLE 4

| | Number of printed sheets | | | | | |
|---|---|---|---|---|---|---|
| | 0 sheet | 4,000 sheets | 8,000 sheets | 12,000 sheets | 16,000 sheets | 20,000 sheets |
| Embodiment 3 (With first supply mode) | OK | OK | OK | OK | OK | OK |
| Comparative Example 2 (Without first supply mode) | OK | OK | OK | NG | NG | NG |

In Comparative Example 2 in which the first supply mode was not executed, at the time when 12,000 sheets were printed, the faulty cleaning occurred. Meanwhile, in Embodiment 3 in which the first supply mode was executed, even at the time when 20,000 sheets were printed, occurrence of the faulty cleaning was not observed. Thus, in Embodiment 3 also, it is possible to inhibit the toner from stagnating inside the cleaning unit 10 and suppress occurrence of the faulty cleaning.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-174193, filed on Oct. 31, 2022, which is hereby incorporated by reference herein in its entirety.

What is claimed is:

1. An image forming apparatus comprising:

a rotatable image bearing member;

a developing device that supplies a developer to a surface of the image bearing member;

a cleaning member that comes into contact with the surface of the image bearing member to form a contact region, the cleaning member removing the developer from the surface in the contact region;

a collecting container that collects the developer removed by the cleaning member, the collecting container having a discharge port for discharging the developer; and a control portion that can execute a supply mode during a non-image-forming period, the supply mode in which a region of the image bearing member that is supplied with the developer from the developing device passes through the contact region with rotation of the image bearing member to allow the cleaning member to supply the developer into the collecting container, wherein the discharge port is provided between a first end portion and a second end portion, which the first end portion is one end portion and the second end portion is another end portion of the image bearing member in a direction of a rotation axis line of the image bearing member, and wherein the control portion performs control such that a portion of the region that is supplied with the developer in the supply mode overlaps, in the direction of the rotation axis line, a position where the discharge port is provided.

2. The image forming apparatus according to claim 1, wherein the discharge port is located on the first end portion side of the image bearing member in the direction of the rotation axis line, and wherein the region is located offset to the one end side in the direction of the rotation axis line.

3. The image forming apparatus according to claim 1, wherein, in a case where the supply mode is assumed to be a first supply mode, the control portion can execute a second supply mode in which the region of the image bearing member that is supplied with the developer from the developing device passes through the contact region with the rotation of the image bearing member to allow the developer to be interposed between the image bearing member and the cleaning member, and wherein the control portion performs control such that the region supplied with the developer in the second supply mode overlaps, in the direction of the rotation axis line, an entire image formable region in the surface of the image bearing member.

4. The image forming apparatus according to claim 1, wherein the control portion executes the supply mode for each predetermined number of printed sheets.

5. The image forming apparatus according to claim 1, wherein the control portion changes an amount of the developer to be supplied in the supply mode according to a value correlated to an amount of use of the developing device.

6. The image forming apparatus according to claim 5, wherein the value correlated to the amount of use of the developing device is an amount of the developer remaining in the developing device or an amount of rotation of a developing roller provided in the developing device.

7. The image forming apparatus according to claim 1, wherein the control portion changes a frequency of the execution of the supply mode according to a value correlated to an amount of use of the developing device.

8. The image forming apparatus according to claim 1, wherein the control portion changes a shape of the region of the image bearing member that is supplied with the developer from the developing device according to a value correlated to an amount of use of the developing device.

9. The image forming apparatus according to claim 1, wherein the region of the image bearing member that is supplied with the developer from the developing device has a transverse band shape in which a width in a rotation direction of the image bearing member is uniform in the direction of the rotation axis line.

10. The image forming apparatus according to claim 1, wherein a portion of the region of the image bearing member that is supplied with the developer from the developing device which overlaps, in the direction of the rotation axis line, a position where the discharge port is provided is larger in width in a rotation direction of the image bearing member than a portion of the region which does not overlap the position where the discharge port is provided.

11. The image forming apparatus according to claim 1, further comprising:

a first conveying screw provided inside the collecting container to rotate around a rotation axis line parallel to the direction of the rotation axis line of the image bearing member and convey the developer toward the discharge port; and a second conveying screw that conveys the developer discharged from the discharge port in a direction perpendicular to the direction of the rotation axis line of the first conveying screw.

12. The image forming apparatus according to claim 11, further comprising:

a conveying member provided at a position between the cleaning member and the first conveying screw inside the collecting container, the conveying member conveying the developer scraped off by the cleaning member from the surface of the image bearing member toward the first conveying screw.

13. The image forming apparatus according to claim 12, wherein the conveying member is a third conveying screw that can rotate around a rotation axis line parallel to the direction of the rotation axis line of the image bearing member, and the third conveying screw has a sheet portion that extends in a direction perpendicular to the rotation axis line of the third conveying screw to push out the developer toward the first conveying screw with rotation of the third conveying screw and a helical portion that conveys the developer in a direction parallel to the rotation axis line of the third conveying screw toward the sheet portion.

14. The image forming apparatus according to claim 1, wherein the image bearing member, the developing device, the cleaning member, and the collecting container are integrally detachable as a process cartridge from the image forming apparatus.

15. An image forming apparatus comprising:

a rotatable image bearing member;

a developing device that supplies a developer to a surface of the image bearing member;

a cleaning member that comes into contact with the surface of the image bearing member to form a contact region, the cleaning member removing the developer from the surface in the contact region;

a collecting container that collects the developer removed by the cleaning member, the collecting container having a discharge port for discharging the developer;

a conveying member that conveys, in a direction of a rotation axis line of the image bearing member, the developer removed by the cleaning member into the collecting container; and a control portion that can execute a supply mode during a non-image-forming period, the supply mode in which a region of the image bearing member that is supplied with the developer from the developing device passes through the contact region with rotation of the image bearing member to allow the cleaning member to supply the developer into the collecting container, wherein the discharge port is provided between a first end portion and a second end portion, which the first end portion is one end portion and the second end portion is another end portion of the image bearing member in the direction of the rotation axis line, and wherein the control portion performs control such that the region supplied with the developer in the supply mode is located, in the direction of the rotation axis line, in a vicinity of and on an upstream side of a position where the discharge port is provided in a direction of a conveyance by the conveying member.

* * * * *